G. W. SUMMERS.
ANVIL.
APPLICATION FILED JAN. 22, 1909.
953,305.
Patented Mar. 29, 1910.
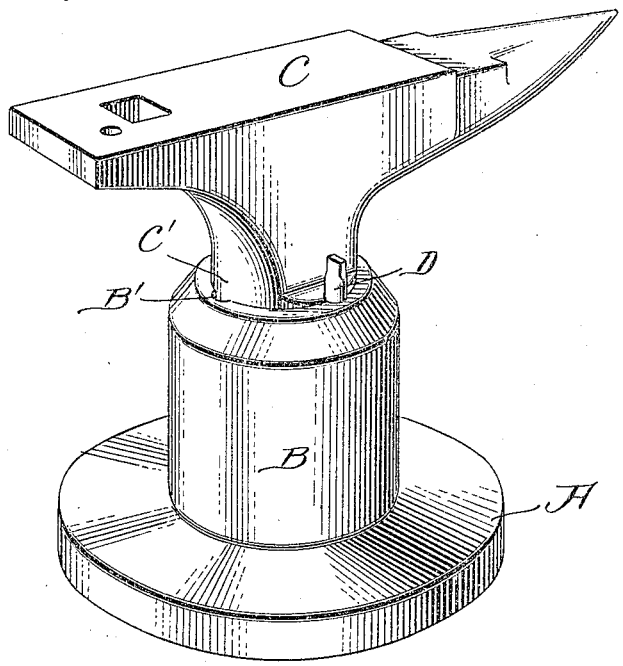
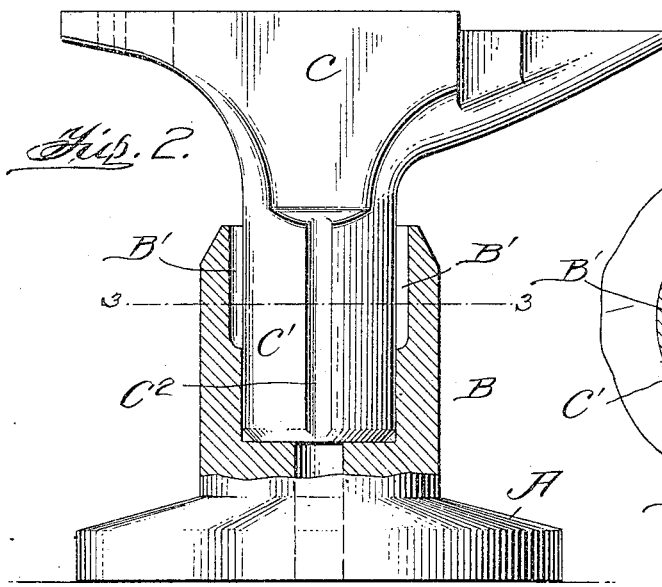
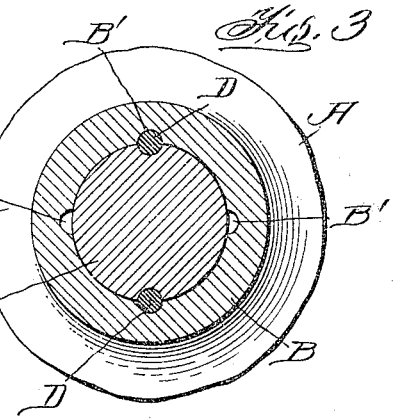
Witnesses
Inventor
George W. Summers
By
Attorney

UNITED STATES PATENT OFFICE.

GEORGE WASHINGTON SUMMERS, OF ANNISTON, ALABAMA.

ANVIL.

953,305.   Specification of Letters Patent.   Patented Mar. 29, 1910.

Application filed January 22, 1909. Serial No. 473,658.

*To all whom it may concern:*

Be it known that I, GEORGE W. SUMMERS, a citizen of the United States, residing at Anniston, in the county of Calhoun and State of Alabama, have invented a new and useful Improvement in Anvils, of which the following is a specification.

This invention relates to anvils and more particularly to revolving anvils, the object being to provide an anvil which is so constructed that it can be easily and quickly turned and locked in its adjusted position.

A further object of my invention is to provide very novel means for locking the anvil in its adjusted position.

A still further object of my invention is to provide an anvil which is exceedingly simple and cheap in construction the parts being so mounted that the strength of the anvil is not weakened in any way, at the same time the anvil can be readily turned when desired.

With these objects in view my invention consists of the novel features of construction hereinafter described, pointed out in the claim and shown in the accompanying drawings, in which, Figure 1 is a perspective view of my improved anvil. Fig. 2 is a vertical section through the same. Fig. 3 is a horizontal section.

In carrying out my improved invention I employ a circular base A provided with a central upwardly projecting tubular casing B, which is provided with oppositely disposed recesses B' on its inner face for the purpose hereinafter described, these recesses being substantially semi-circular in cross section.

Mounted within the tubular casing B is a circular stem C' of an anvil C which is of the ordinary construction now in use. The circular portion is provided with longitudinal oppositely disposed grooves $C^2$ substantially semi-circular in cross section and adapted to register with the recesses of the casing and to be locked within the same so as to prevent it from being turned by pins D to force down into the recesses and grooves after the anvil had been turned in its adjusted position. It will be seen that by this arrangement the anvil can be adjusted in four different positions and it is of course understood that by providing the tubular casing with more recesses more adjustments can be obtained by the anvil.

From the foregoing description it will be seen that I have provided a revoluble anvil which is so constructed that the anvil proper can be turned into most any position desired and locked in this position, it of course being understood that the circular stem portion of the anvil rests upon the bottom of the tubular portion.

What I claim is:

The combination with a base provided with a tubular casing having internally oppositely disposed semi-circular vertical recesses, an anvil mounted in the circular casing with oppositely disposed semi-circular vertical grooves adapted to register with the recesses of the casing and pins adapted to be forced into said grooves and recesses for locking said anvil.

GEORGE WASHINGTON SUMMERS.

Witnesses:
O. H. PARKER,
JNO. A. CARTER, Jr.